(12) United States Patent
Watkins et al.

(10) Patent No.: US 9,985,891 B2
(45) Date of Patent: May 29, 2018

(54) CONGESTION MANAGEMENT IN DISTRIBUTED SYSTEMS USING AUTONOMOUS SELF-REGULATION

(71) Applicant: Oracle International Corporation, Redwood City, CA (US)

(72) Inventors: John Watkins, Sunnyvale, CA (US); Joseph Wright, Round Rock, TX (US)

(73) Assignee: Oracle International Corporation, Redwood City, CA (US)

( * ) Notice: Subject to any disclaimer, the term of this patent is extended or adjusted under 35 U.S.C. 154(b) by 236 days.

(21) Appl. No.: 15/093,681

(22) Filed: Apr. 7, 2016

(65) Prior Publication Data
US 2017/0295098 A1    Oct. 12, 2017

(51) Int. Cl.
*G06F 15/173* (2006.01)
*H04L 12/801* (2013.01)
*H04L 12/26* (2006.01)

(52) U.S. Cl.
CPC .......... *H04L 47/12* (2013.01); *H04L 43/0882* (2013.01); *H04L 43/16* (2013.01)

(58) Field of Classification Search
CPC ...... H04L 47/12; H04L 43/0882; H04L 43/16
USPC ........................................................ 709/224
See application file for complete search history.

(56) References Cited

U.S. PATENT DOCUMENTS

| | | | |
|---|---|---|---|
| 6,628,609 B2 | 9/2003 | Chapman et al. | |
| 7,894,348 B2 | 2/2011 | Dropps et al. | |
| 7,952,998 B2 | 5/2011 | Gregg et al. | |
| 8,370,496 B1 * | 2/2013 | Marr | H04L 67/1031 370/396 |
| 8,392,575 B1 * | 3/2013 | Marr | G06F 9/5061 370/252 |
| 8,467,342 B2 | 6/2013 | Loh et al. | |
| 8,509,078 B2 * | 8/2013 | Moscibroda | H04L 45/00 370/230 |
| 8,811,183 B1 | 8/2014 | Anand et al. | |
| 9,210,048 B1 * | 12/2015 | Marr | H04L 41/145 |
| 9,258,253 B2 * | 2/2016 | Subramanian | H04L 49/356 |
| 9,319,336 B2 * | 4/2016 | Thakkar | H04L 47/50 |

(Continued)

OTHER PUBLICATIONS

"Cisco UCS I/O Module and Fabric Interconnect Connectivity", Retrieved from URL: https://www.safaribooksonline.com/library/view/ccna-data-center/9780133860429, CCNA Data Center DCICT 640-916 Official Cert Guide, pp. 1-4.

(Continued)

*Primary Examiner* — Melvin H Pollack
(74) *Attorney, Agent, or Firm* — Robert C. Kowert; Meyertons, Hood, Kivlin, Kowert & Goetzel, P.C.

(57) ABSTRACT

A firmware controller of a node of a distributed system determines a self-regulation threshold for at least one metric associated with traffic transmitted via an interconnect. The threshold is set to a value lower than the maximum permitted by the interconnect protocol. The controller transmits a request to an application-layer traffic endpoint to limit traffic based on the threshold. A hardware congestion management unit collects measurements on traffic metrics, including at least one metric other than the one for which the threshold is defined. Based on measurements obtained from the hardware congestion management unit, the controller modifies the self-regulation threshold and notifies the application-layer endpoint.

20 Claims, 9 Drawing Sheets

(56) References Cited

U.S. PATENT DOCUMENTS

| | | | |
|---|---|---|---|
| 9,385,962 B2* | 7/2016 | Rimmer | H04L 47/39 |
| 9,565,106 B2* | 2/2017 | Ajanovic | G06F 13/124 |
| 9,628,382 B2* | 4/2017 | Birrittella | H04L 45/66 |
| 9,671,960 B2* | 6/2017 | Patel | G06F 3/0608 |
| 9,680,708 B2* | 6/2017 | Kasturi | H04L 41/0896 |
| 2002/0159385 A1 | 10/2002 | Susnow et al. | |
| 2005/0108444 A1 | 5/2005 | Flauaus et al. | |
| 2010/0088437 A1 | 4/2010 | Zahavi | |
| 2011/0267942 A1 | 11/2011 | Aybay et al. | |
| 2012/0096211 A1* | 4/2012 | Davis | H04L 49/101 710/314 |
| 2015/0180782 A1* | 6/2015 | Rimmer | H04L 69/22 370/236 |
| 2015/0263960 A1* | 9/2015 | Kasturi | H04L 47/22 370/230.1 |
| 2015/0288753 A1* | 10/2015 | He | H04L 67/1012 709/224 |
| 2016/0188501 A1* | 6/2016 | Chan | G06F 13/1673 710/113 |
| 2017/0187629 A1* | 6/2017 | Shalev | H04L 43/0823 |
| 2017/0237671 A1* | 8/2017 | Rimmer | H04L 47/2425 370/235 |

OTHER PUBLICATIONS

Jiuxing Liu, et al., "Implementing Efficient and Scalable Flow Control Schemes in MPI over InfiniBand", Parallel and Distributed Processing Symposium, Proceedings 18th International. IEEE, 2004, pp. 1-11.

Oracle, "Delivering Application Performance with Oracle's InfiniBand Technology: A Standards-Based Interconnect for Application Scalability and Network Consolidation", 2012, pp. 1-39.

Ludmila Cherkasova, et al., "Components of Congestion Control", In SPAA, Symposium on Parallel Algorithms and Architectures, Jun. 1996, pp. 1-11.

Cisco, "Cisco Unified Computing System Ethernet Switching Modes", 2012, pp. 1-13.

* cited by examiner

CONGESTION MANAGEMENT IN DISTRIBUTED SYSTEMS USING AUTONOMOUS SELF-REGULATION

BACKGROUND

System architectures that provide a solution by dividing a problem set into a number of smaller parts and processing the collection of parts in parallel at respective nodes have become increasingly common. Such distributed systems have come to represent an increasingly effective means of approaching complex problems due to a number of trends, including but not limited to improvements in parallel processing algorithms, the availability of low-cost power-efficient computing nodes, and the availability of high-bandwidth interconnect fabrics. Distributed system approaches are now used in a number of problem domains, including the processing of complex database queries, machine learning and other artificial intelligence algorithms, and so on.

Overall system performance in such distributed systems may depend upon a number of factors such as the number of processing nodes, each node's performance capability, the scalability of the parallel processing algorithms, the amount of node intercommunication required, and the performance of the interconnect fabric or fabrics to which the nodes are attached. Some applications nay require considerable communication between nodes (at least during certain phases of an application), making the interconnect fabric performance an important factor in overall performance. Given this, the architecture of the interconnect fabric may represent a major part of the total system design. Ideally, at least for some applications, distributed systems would employ an all-to-all interconnect such that each node has a dedicated link to every other node in the system. However, in practice, this type of implementation may not scale as the number of nodes increases. Power, cost, size, and hardware/software complexity constraints may tend to make the all-to-all interconnect approach infeasible.

Consequently, distributed systems containing hundreds or thousands of nodes may often employ a hierarchical interconnect architecture. In such an approach, some number of links in the fabric may have to handle traffic associated with multiple nodes. Such shared links may not be able to sustain the amount of traffic that could potentially be generated if all of the multiple nodes operated at their maximum traffic-generating capacity. In a well-balanced distributed system, the probability of overloading a shared link in this manner may typically be low, although such overload situations may nevertheless occur occasionally. Depending on the traffic management algorithms employed at the distributed system, data movement between application-layer components may be slowed substantially during such situations. As a result, overall application performance may be substantially degraded, especially in scenarios in which multiple nodes transmit traffic based on greedy approaches (e.g., approaches which consume as much bandwidth as permitted by the protocols in use).

SUMMARY

Various embodiments of systems, apparatus and methods for self-regulation based traffic congestion management for interconnects deployed at distributed systems are disclosed. According to one embodiment, a distributed system may comprise a plurality of leaf-level nodes and one or more non-leaf-level nodes. The nodes of at least one set of leaf-level nodes may be implemented at respective computing devices and connected to one another via a first interconnect. Individual nodes of the set may comprise a respective congestion management component which includes a firmware microcontroller and a hardware congestion management unit, as well as a respective application-layer traffic endpoint (e.g., one or more processes or threads which are sources and/or destinations of interconnect traffic). The firmware microcontroller of a particular node may determine a first self-regulation threshold with respect to a particular traffic metric. The self-regulation threshold may be set lower than a protocol-limited maximum level permissible for that traffic metric (or, equivalently, higher than a protocol-specified minimum level permissible for that traffic metric). For example, if a protocol which in use permits 100% of the outstanding flow control credits for a particular type of packet with respect to a particular link partner to be consumed, the self-regulation threshold for the flow control credits may be set to 75% instead of the maximum allowed level of 100%. Similarly, if packets can be sent from one node to a second node at a maximum rate of M packets per second, the self-regulation threshold for outbound throughput may be set to 75% of M or 50% of M. Self-regulation metrics may be set independently for any of various metrics in various embodiments, such as transmit bandwidth, consumed flow control credits with respect to a link partner of the particular node, and the like. The firmware microcontroller of a particular node may transmit, to the application-layer traffic endpoint of the particular node, a request to limit traffic in accordance with the first self-regulation threshold.

A hardware congestion management unit of a node may be configured to obtain measurements corresponding to a number of traffic metrics, including but not necessarily limited to the metric for which the first self-regulation threshold is determined, with very low overhead. In various embodiments, the firmware microcontroller may obtain the measurements collected by the hardware congestion management unit. If the measurements obtained indicate that a self-regulation adjustment criterion is met, the firmware microcontroller may modify the first self-regulation threshold, and the application-layer traffic endpoint may be notified to modify its traffic accordingly. In at least some scenarios, the self-regulation threshold may apply to a particular metric (e.g., transmit bandwidth), and measurements corresponding to a different metric (e.g., flow control credits) may trigger the modification of the self-regulation threshold. For example, if a self-regulation threshold is applied to transmit bandwidth at a point in time, and an indication that additional flow control credits have become available at a link partner is received, the bandwidth threshold may be increased.

According to some embodiments, the distributed system may comprise a plurality of interconnects. For example, a given set of leaf-level nodes may utilize a Peripheral Component Interconnect—Express (PCI-E) interconnect, while multiple such sets of leaf-level nodes may be connected to one another via non-leaf nodes which communicate with other non-leaf-level nodes using Infiniband™. In one embodiment, different groups of leaf-level nodes may employ distinct interconnect technologies. In some embodiments, at least some of the interconnects used may not necessarily be lossless (e.g., packet loss may be tolerated at the transport layer or some other layer of the networking stack). Low-overhead self-regulation based techniques implemented at the firmware and hardware level, similar to those indicated above, may be utilized at various leaf-level and/or non-leaf-level nodes in distributed systems that employ heterogeneous or homogeneous interconnects in various embodiments. In some embodiments in which distributed systems employ heterogeneous interconnects, bridge nodes (e.g., host channel adaptors) between a pair of interconnects may utilize information collected about traffic congestion at one interconnect (e.g., Infiniband™) to influence traffic self-regulation at a different interconnect (e.g., PCI-E).

In one embodiment, a hardware congestion management unit at a node of a distributed system may comprise a link partner flow control credit monitor. During initialization of a link with a peer node, the credit limits advertised by the peer node with respect to receive buffers may be determined at the flow control credit monitor and provided to the local firmware microcontroller. Subsequently, when a flow control packet indicating a change in the available credits is received at the node, the flow control credit monitor may intercept the flow control packet and notify the firmware of the change. Depending on the extent of the change, the firmware microcontroller may take responsive actions, such as modifying a self-regulation threshold and notifying the application-layer traffic endpoint. In some embodiments in which separate flow control credits are defined for respective traffic types (e.g., posted versus non-posted PCI-E traffic), respective self-regulation thresholds may be set for more than one traffic category.

The hardware congestion management unit at a node of the distributed system may comprise a bandwidth monitor in some embodiments. The bandwidth monitor may comprise a plurality of registers accessible from the firmware microcontroller. In one implementation, the firmware may store, at respective registers of the bandwidth monitor, (a) a bandwidth monitoring interval, (b) an indication of a traffic direction with respect to which bandwidth is to be monitored, and (c) an indication that bandwidth monitoring is enabled. In another register, an indication of a number of time units of a given bandwidth monitoring interval during which traffic was flowing between the node and a link partner of the node may be stored by the bandwidth monitoring logic. In one embodiment, an interrupt may be generated at the bandwidth monitor to notify the firmware that the requested bandwidth measurement for a given interval is available. In at least some embodiments, the monitoring of bandwidth usage in one or more directions (and/or other metrics) may be temporarily disabled by the firmware, e.g., based on power consumption constraints. A number of different algorithms with respect to bandwidth monitoring may be utilized in different embodiments, with the algorithms differing from one another in parameters such as the respective durations for which bandwidth measurements in a given direction (e.g., outbound versus inbound, upstream versus downstream, etc.) are to be collected, whether and when bandwidth measurements are to be disabled based on power consumption considerations, and so on.

According to at least some embodiments, different nodes of the distributed system may operate autonomously or independently of one another when making congestion control decisions, e.g., without a centralized system-wide congestion control coordinator. One node may designate and adjust a self-regulation threshold for one traffic metric, while another node may designate and adjust a self-regulation metric for another traffic. Two nodes which have selected self-regulation thresholds for the same traffic metric (e.g., transmit bandwidth) may set those thresholds to different values—e.g., during a time period in which the threshold is set to T1 units by node N1, node N2's threshold may be T2 units. Some nodes may have disabled traffic measurements at a point in time at which other nodes may be collecting traffic measurements, and so on. In general, in various embodiments, little or no inter-node coordination or synchronization may be required with respect to congestion control operations. Such an autonomous approach may be especially well-suited to distributed applications whose node-level subcomponents may exhibit non-uniform traffic requirements, either with respect to time (e.g., a given node's traffic needs may change over time) or with respect to traffic destinations (e.g., the particular peer nodes to/from which traffic flows with respect to a given node may change over time). In some embodiments, while traffic measurements results may flow from some nodes of the distributed system to other nodes (e.g., from at least some non-leaf nodes such as bridge nodes to leaf nodes), at least some of the decisions taken as a result of the measurements may be made autonomously at the individual nodes.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION OF EMBODIMENTS

Figure 1:
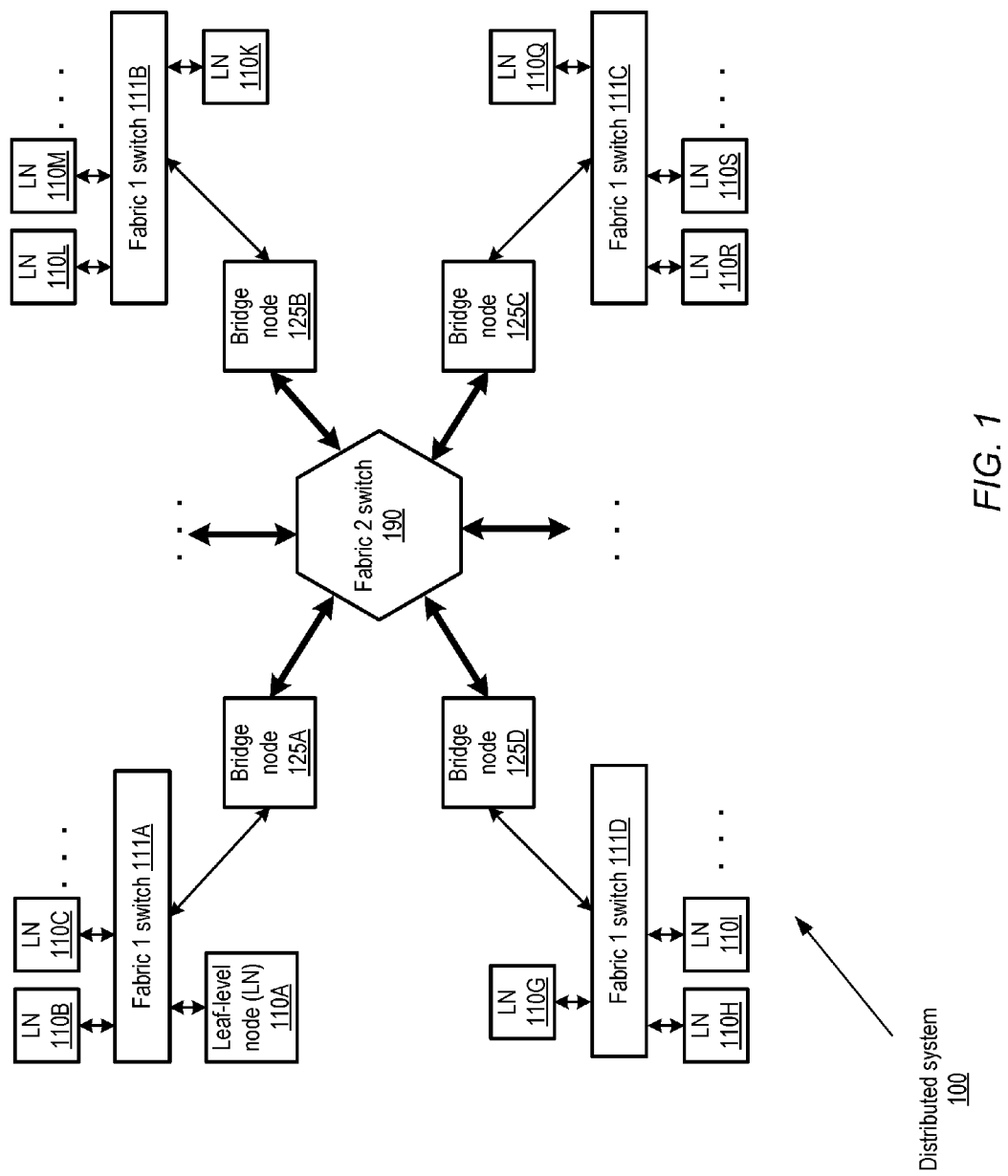
FIG. 1 illustrates an example distributed system environment in which a plurality of interconnects may be deployed, according to at least some embodiments.

FIG. 1 illustrates an example distributed system environment in which a plurality of interconnects may be deployed, according to at least some embodiments. As shown, distributed system 100 comprises a plurality of nodes, including numerous leaf-level nodes (LNs) 110 such as LNs 110A, 110B, 110C, 110G, 110H, 110I, 110K, 110L, 110M, 110Q, 110R and 110S. The terms "leaf nodes" and "leaf-level nodes" may be used synonymously herein. At least two types of interconnect fabrics may be utilized in distributed system 100, including fabrics generically denoted by the labels Fabric 1 and Fabric 2. A set of leaf nodes may be connected to a shared Fabric 1 switch 111—for example, LNs 110A-110C are connected to Fabric 1 switch 111A, LNs 110G-110I are connected to Fabric 1 switch 111D, and so on. Fabric 1 switches 111 in turn may be connected to bridge nodes 125—e.g., bridge node 125A connects Fabric 1 switch 111A with a Fabric 2 switch 190, bridge node 125B connects Fabric 1 switch 111B with Fabric 2 switch 190, and so on. Fabric 2 switch 190 may in turn be connected to other Fabric 2 switches (not shown in FIG. 1) and/or to additional bridge nodes in the depicted embodiment. Fabric 1 switches, bridge nodes 125 and Fabric 2 switches may be referred to as non-leaf nodes herein. Pairs of nodes which are connected via a physical link of any one of the interconnects may be referred to as link partners—e.g., a leaf node such as 110A and the Fabric 1 switch 111A to which it is connected may form one example pair of link partners, switch 111A and bridge node 125A may form another example pair of link partners, and so on.

Various computational and/or storage-related components of a distributed application may run at the leaf nodes 110 in the depicted embodiment. For example, a high-performance parallel database may comprise some number of query processors, with a respective query processor being instantiated at each leaf node. A given complex query may be subdivided into smaller subqueries or query partitions units in such a parallel database environment, with respective subqueries being processed at respective leaf nodes 110. Results of at least some query processing operations may be transmitted from one leaf node to another via some combination of Fabric 1 and Fabric 2. Query-related traffic may in general flow in both outbound (from a given node) and inbound (to a given node) directions with respect to leaf nodes. The ratio of outbound to inbound traffic may be application-dependent and/or time-dependent—e.g., it may not be straightforward to predict the number of packets flowing between any two leaf-level nodes in either direction over any given time interval with great accuracy.

Any combination of a variety of fabrics and associated communication protocols may be employed in distributed system 100. For example, in one embodiment, Fabric 1, which is used to connect the leaf nodes 110, may comprise a version of PCI-E, while Fabric 2 may comprise a version of Infiniband™. In such an embodiment, a bridge node 125 may comprise a host channel adaptor such as a PCI-E-to-Infiniband host channel adaptor. In some embodiments, only lossless fabrics or protocols may be employed, while in other embodiments, fabrics/protocols which are tolerant to packet loss (e.g., protocols in which retransmissions of lost or dropped packets is attempted) may be used, or a combination of lossless and loss-tolerant fabrics/protocols may be used.

In the embodiment depicted in FIG. 1, at least some of the leaf nodes 110 may comprise a respective set of low-overhead congestion management components designed to self-regulate the flow of traffic, e.g., to avoid scenarios in which the utilization of interconnect links becomes so high that application performance becomes degraded. Such components may include, for example, a hardware congestion management unit and/or a firmware execution engine. The firmware execution engine may also be referred to as a firmware microcontroller or a firmware controller. In some embodiments, a firmware microcontroller may determine one or more self-regulation thresholds with respect to respective traffic metrics of the leaf node, such as the number of outbound traffic packets generated per unit time and/or the target number of available or unused flow control credits (or consumed flow control credits) at the leaf node's link partner (e.g., a Fabric 1 switch 111) for a particular category of network packet.

The initial value for a self-regulation threshold may, for example, be provided as part of the configuration settings of the node, or may be included as part of the collection of firmware which may be distributed to the leaf nodes. In various embodiments, the self-regulation threshold value for a given metric may be set at a lower level than the maximum permitted for that metric by the protocol and/or interconnect fabric in use. For example, in the case of PCI-E, a packet sender may be permitted by the PCI-E specification to send as many packets as can be accommodated at the link partner's receive buffers, as indicated by the number of available flow control credits. Instead of using a greedy approach of using up as many available flow control credits as are available (assuming, of course, that enough outbound traffic is being generated by the application-layer traffic source at the node to use up the credits), the firmware running at the node may set a self-regulation threshold target of using up no more than 75% of the flow control credits. In a logically equivalent formulation, a self-regulation threshold may sometimes be set to a value which is higher than the protocol-specified minimum—e.g., instead of leaving a 0% of credits flow control credits unused (which may be the minimum percentage permitted by the protocol), a threshold value indicating that 25% of the credits are to remain unused may be set.

An indication of self-regulation threshold may be provided by the firmware layer to the application-layer components of the node, which may be ultimately responsible for generating the outbound traffic and processing the inbound traffic at the node. Such application-layer components which are the sources and destinations of the traffic may be referred to as application-layer traffic endpoints. Based on the self-regulation threshold information provided by the firmware microcontroller, an application-layer endpoint may limit the rate at which new traffic is generated (and/or consumed) at the node.

A hardware congestion management unit may collect one or more traffic metrics with very low overhead, with various parameters of the measurements being directed by the firmware microcontroller in at least some embodiments. The set of metrics for which measurements are collected during a given interval may include at least some metrics for which a self-regulation threshold may not necessarily have been designated by the firmware for that interval. The collected metrics may be examined at the firmware microcontroller. If an adjustment criterion with respect to the self-regulation threshold(s) in place is met, the firmware may modify one or more self-regulation thresholds and notify the application-layer traffic endpoints to adjust traffic generation accordingly. In at least some embodiments, a self-regulation threshold may be set for a first metric (e.g., outbound bandwidth usage), while measurements collected for a different metric (e.g., available flow control credits) may be used to modify the threshold. For example, if flow control credit messages indicate that a link partner has more buffer space available to receive packets than before (as measured over some time interval), a threshold value for outbound or transmit bandwidth may be increased.

In various embodiments, at least some of the flow control decisions made at a given leaf node 110 may be made autonomously or independently with respect to the flow control decisions being made at other nodes, e.g., without being directed by a centralized congestion management coordinator. The value of a self-regulation threshold designated for a particular metric M1 at a particular node 110A during interval Interval1, for example, may differ from (and may be determined independently from) the value set for that same metric M1 at node 110G or 110C during Interval1. Even the set of metrics for which self-regulation thresholds are designated at leaf node 110A during a time interval Interval1 may differ from the set of metrics for which self-regulation thresholds are designated at leaf node 110B or 110K during Interval1 in some embodiments. Each node's congestion control subsystem may operate so as to proactively avoid problematic levels of congestion with respect to its own neighborhood. As a result, the overall level of congestion within distributed system 100 may be kept low enough to avoid performance problems for the applications being run, or at least low enough to avoid drastic variations in performance levels.

In some embodiments, at least some leaf nodes 110 may be implemented according to a low-power, low-cost system-on-chip architecture. In one such embodiment, one or more features of the congestion control management subsystems, such as the monitoring of bandwidth usage, may be disabled during certain time intervals to keep power consumption within targeted limits.

In various embodiments, in addition to or instead of being implemented at leaf nodes 110, efficient congestion control techniques based on autonomous self-regulation may be implemented at other nodes of distributed system 100, such as bridge nodes 125, Fabric 1 switches 111, Fabric 2 switches 190 and the like. In at least one embodiment, separate sets of metrics may be collected for different traffic categories (e.g., for posted versus non-posted PCI-E packets), and/or separate self-regulation thresholds may be set for the different traffic categories. In some embodiments, a mechanism to push new versions of firmware (or new configuration settings for existing firmware) to selected sets of nodes may be provided, e.g., enabling the tuning of the congestion control subcomponents for different applications or for different workloads.

Figure 2:
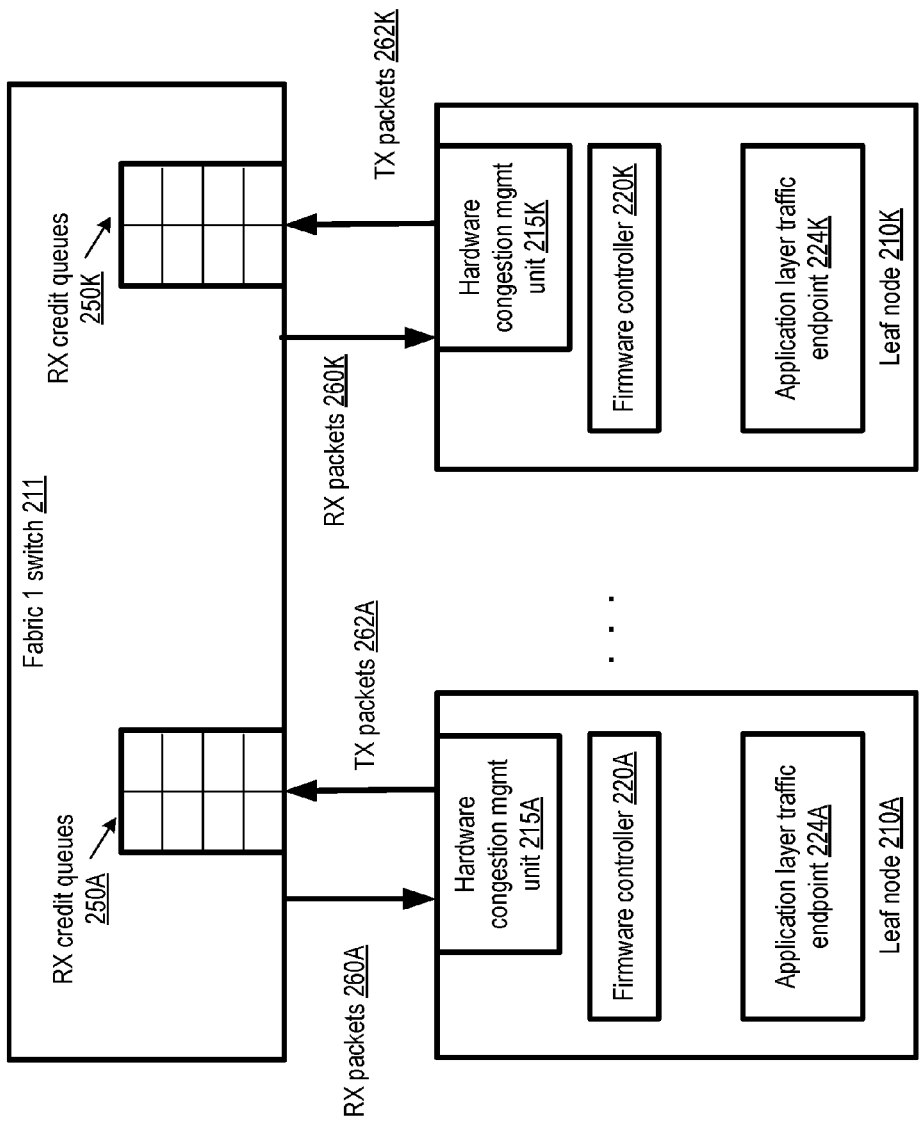
FIG. 2 illustrates example congestion control-related subcomponents of nodes of a distributed system, according to at least some embodiments.

FIG. 2 illustrates example congestion control-related subcomponents of nodes of a distributed system, according to at least some embodiments. Two leaf nodes 210A and 210K of the distributed system are shown, each connected to a Fabric 1 switch 211 via a respective bidirectional Fabric 1 link. Outbound traffic from the perspective of the leaf node (packets sent from a leaf node 210 to switch 211, such as packets 262A or 262K) is designated as "TX" or transmit traffic, while inbound traffic from the perspective of the leaf node is designated as "RX" or receive traffic (such as packets 260A or 260K) in FIG. 2. In accordance with the specification of Fabric 1, the switch 211 may implement respective RX credit queues 250 for each linked leaf node 210—e.g., RX credit queues 250A for leaf node 210A, and RX credit queues 250K for leaf node 210K. The credit queues 250 may indicate the number of receive buffers available (or the cumulative amount of receive buffer space available) at the switch 211 for packets sent from the leaf nodes 210. In at least some embodiments, respective credit queues may be maintained for several different categories or types of packets.

Each leaf node 210 in FIG. 2 may comprise a respective hardware congestion management unit 215 (e.g., 215A or 215K), a respective firmware microcontroller 220 (e.g., 220A or 220K), and a respective application-layer traffic endpoint 224 (e.g., 224A or 224K). The application-layer traffic endpoint 224 may comprise, for example, one or more processes or threads of execution which implement the logic of one or more distributed applications deployed at the distributed system comprising the nodes 210. For example, query processing may be performed at application-layer traffic endpoints in a scenario in which the distributed system is being used for a parallel database, while the training and/or testing of machine learning models may be performed at application-layer traffic endpoints in a scenario in which the distributed system is being used for implementing an artificial intelligence algorithm. In some embodiments in which the distributed system may be deployed for several parallel applications with different data transfer behavior patterns, respective sets of firmware configuration settings may be utilized for the different applications.

In the embodiment depicted in FIG. 2, the firmware microcontrollers 220 may transfer information pertaining to traffic management to/from the hardware congestion management units 215, and to/from the application layer traffic endpoints. For example, the firmware microcontrollers may set and read various registers of the hardware congestion management units as discussed below in further detail to obtain traffic measurements. The measurements obtained from the hardware layer may impact self-regulation thresholds set by the firmware microcontroller. The firmware microcontroller may also notify the application-layer traffic endpoints to change the rates at which traffic is generated at the endpoints based on changes made to the self-regulation thresholds. In some embodiments, the responsibilities for congestion management may be divided slightly differently—for example, the firmware may simply convey traffic measurement information to the application layer, and the thresholds regarding self-regulation may be determined at the application layer. In some embodiments, other components, such as operating system or kernel-layer software may also participate in congestion management decisions.

Figure 3:
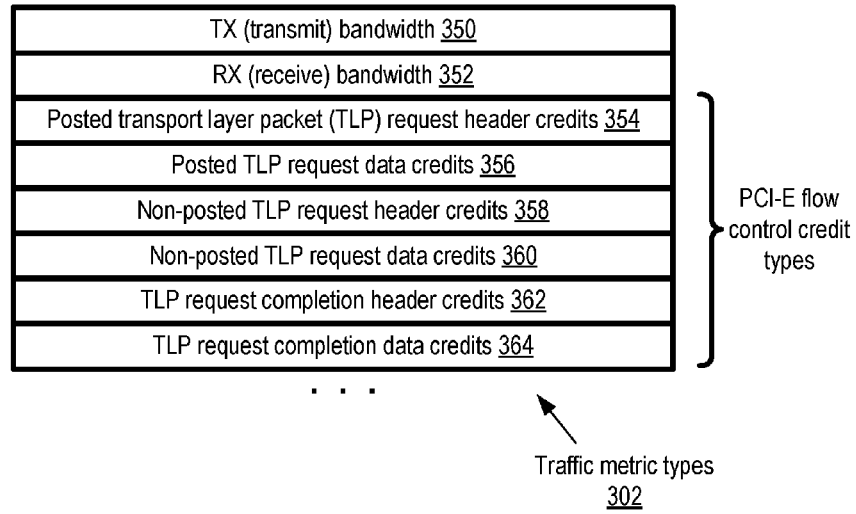
FIG. 3 illustrates example traffic metrics for which respective self-regulation thresholds may be set autonomously at different nodes of a distributed system, according to at least some embodiments.
Figure 3:
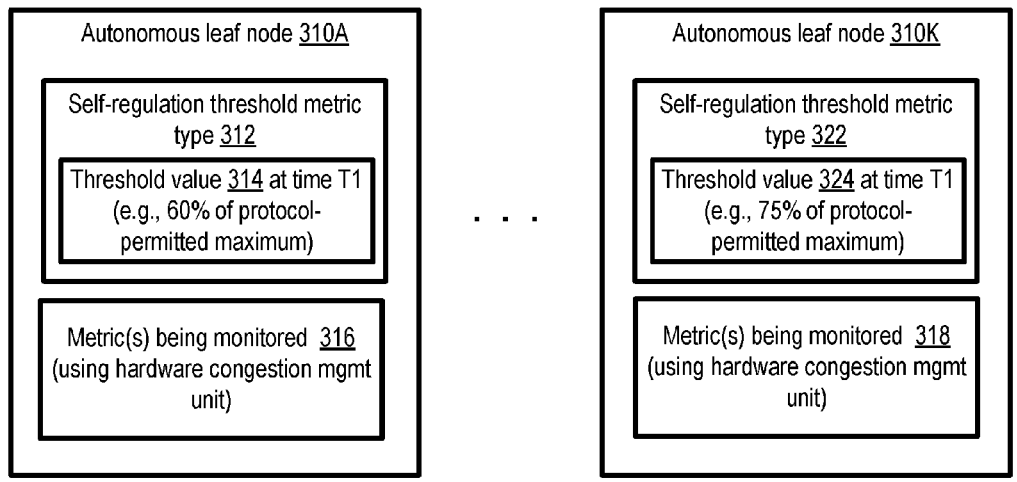

FIG. 3 illustrates example traffic metrics for which respective self-regulation thresholds may be set autonomously at different nodes of a distributed system, according to at least some embodiments. The traffic metric categories 302 of the depicted embodiment may include transmit or outbound bandwidth 350, receive or inbound bandwidth 352, as well as six different types of flow control credits. Generally speaking, flow control credits with respect to a particular node may indicate the number or cumulative size of receive buffers available at a link partner of the node. For example, with respect to a given leaf node such as LN 110A of FIG. 1, the credits may represent receive buffer space availability at the Fabric 1 switch to which the leaf node is attached (e.g., Fabric 1 switch 111A).

The example categories of flow control credit shown in FIG. 3 correspond to the packet types defined for PCI-E interconnects. In PCI-E, various transport layer packet (TLP) operations may be categorized as "posted" operations, "non-posted" operations, or "completion" operations, and separate flow control credits indicative of available buffer space may be defined for each of the categories. Flow control credits 354 and 356 are defined for headers and data buffers respectively with respect to posted transactions in the depicted embodiment. In addition, non-posted TLP request header credits 358, non-posted TLP request data credits 360, TLP request completion header credits 362, and TLP request completion data credits 364 may also be defined. In PCI-E, each of the six credit types shown in FIG. 3 may be used to manage the consumption of buffers from a logically separate pool. In one implementation, for example, credit accounting may be performed in units of four data words (16 bytes), rounded up to the next integer number of units in the event that the number of bytes in the packet is not an exact multiple of 16 bytes. Since PCI-E headers may typically take up less than 16 bytes, a given TLP transmitted may consume one unit from the corresponding type of header credit in such an implementation. When data is transmitted, the number of consumed units from the corresponding type of credit is the number of 16-byte units in the TLP, rounded upwards. A TLP may only be transmitted, according to the PCI-E specification, if sufficient credits for the header and the data are available. It is noted that although credit types specific to PCI-E are shown by way of example in FIG. 3, flow control credit types corresponding to interconnect technologies other than PCI-E may be included among the traffic metrics 302 used for self-regulated congestion control in various embodiments.

In at least some embodiments, the leaf nodes of the distributed system may operate independently of each other with respect to self-regulation for congestion control. In FIG. 3, two examples of autonomous leaf nodes, 310A and 310K are shown. Each node's congestion management subcomponents may modify congestion control parameters as appropriate based on the local conditions seen at the node—e.g., based on the metrics being monitored locally using the hardware congestion management unit, the rates at which packet are being generated or consumed at the local application layer traffic endpoint, and so on. It may be the case that at a given point in time, the set of traffic metric types 312 for which self-regulation thresholds are set by the firmware at node 310A may differ from the set of traffic metric types 322 for which self-regulation thresholds are set by the firmware at node 310K. Even if self-regulation thresholds are set for the same metric type at nodes 310A and 310K, the values of the thresholds may differ at a given point in time at the different nodes—e.g., threshold value 314 at node 310A at time T1 may be set to 60% of the protocol-permitted maximum value for the metric, while threshold value 324 at the same point in time may be set to 75% of the protocol-permitted maximum. Furthermore, the set of traffic metrics 316 and 318 that are being measured using the hardware congestion management units at the different nodes 310A and 310K may differ from one another—e.g., at time T1, the rate of outbound packets (TX bandwidth) may be being measured at node 310A while the rate of inbound packets (RX bandwidth) may be being measured at node 310K. In some embodiments, at least some subset of the nodes of the distributed system may utilize shared or common congestion control parameters during one or more time intervals—that is, different nodes may not necessarily use different parameters for congestion control at all times. In some embodiments, for example, a common initial set of congestion control parameters may be utilized at the firmware layer during node initialization at each of the nodes, but the threshold settings and/or monitored metrics may diverge at the different nodes over time as local conditions change.

Figure 4:
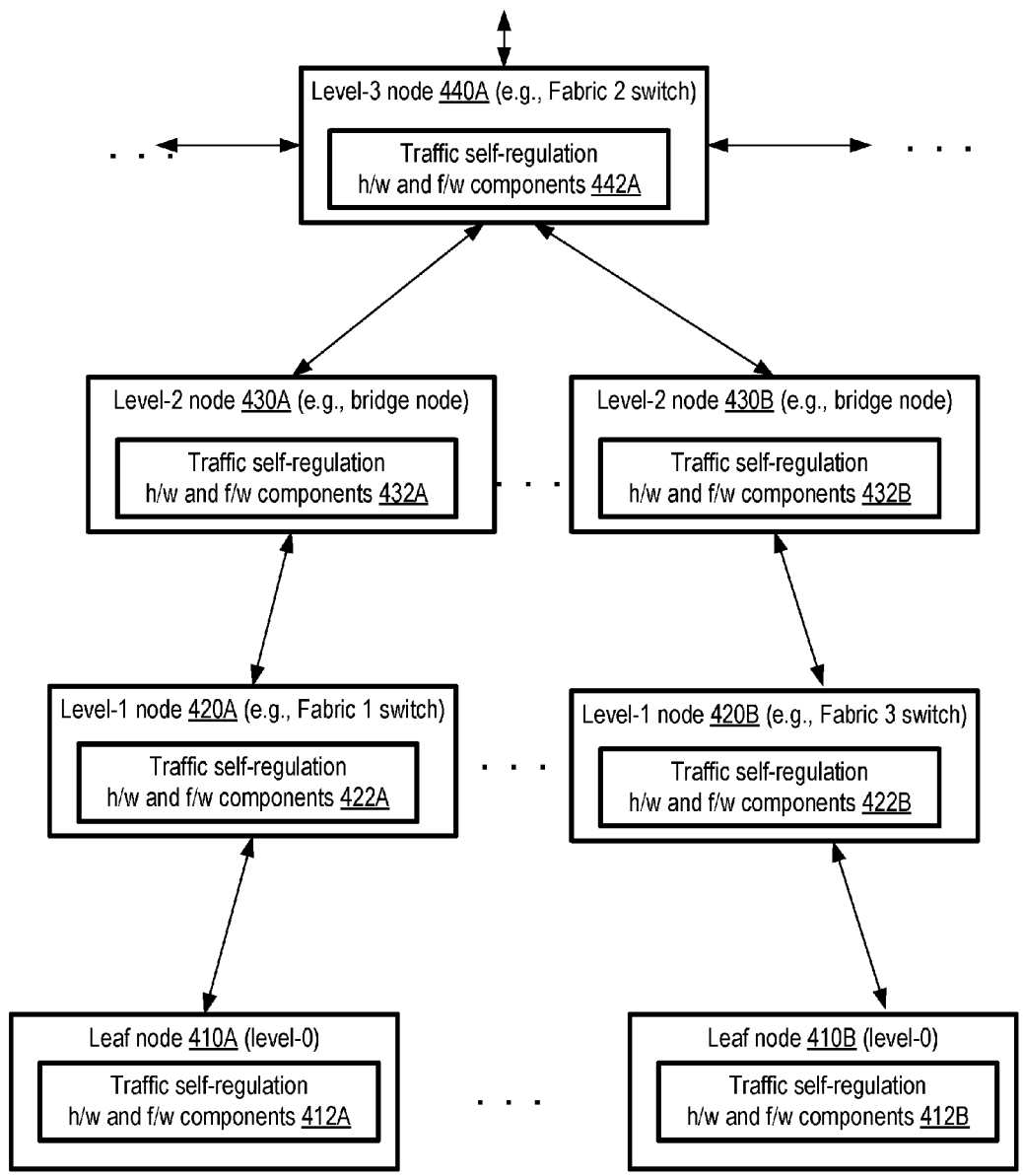
FIG. 4 illustrates example congestion control subcomponents at leaf nodes and non-leaf nodes of a distributed system, according to at least some embodiments.

FIG. 4 illustrates example congestion control subcomponents at leaf nodes and non-leaf nodes of a distributed system, according to at least some embodiments. In FIG. 4, the nodes of the distributed system are subdivided into at least four categories or levels based on their position within a tree-like hierarchy. Each level-0 node or leaf node, such as nodes 410A and 410B, is connected to a level-1 node 420 (e.g., a Fabric 1 switch 420A in the case of leaf node 410A, and a Fabric 3 switch 420B in the case of leaf node 410B). Thus, different sub-groups of leaf nodes 410 may be linked to each using distinct fabrics in the depicted embodiment. Each level-1 node may in turn be linked to a level-2 node, such as bridge node 430A or bridge node 430B. Bridge nodes 430A and 430B may in turn be linked to a Fabric 2 switch 440A which represents a level-3 node. The level-3 node 440A may be connected to other level-3 nodes and/or to one or more level-4 nodes (not shown in FIG. 4), depending on the total number of levels in the distributed system hierarchy.

In the depicted embodiment, each node at each level may comprise a respective set of traffic self-regulation components. For example, the depicted level-0 nodes may comprise self-regulation components 412A and 412B, level-1 nodes may comprise self-regulation components 422A and 422B, level-2 nodes may comprise self-regulation components 432A and 432B, and the level-3 node may comprise self-regulation component 442. In some embodiments, the self-regulation components may be implemented at the firmware and/or hardware level at each of the different nodes, e.g., to minimize processing and power consumption overheads associated with traffic management. In other embodiments, at least some of the self-regulation logic at some layers may be implemented at higher levels of the hardware/software stack instead of at the hardware or firmware levels. In at least one embodiment, respective sets of traffic self-regulation components may be implemented for upstream traffic (i.e., packets flowing away from the leaf nodes) and downstream traffic (i.e., packets flowing towards the leaf nodes). In some cases, for example at the bridge nodes, different types of traffic metrics may be associated with upstream traffic than with downstream traffic (since different interconnects/protocols may be used for upstream versus downstream traffic). In some embodiments, self-regulation may be employed at only a subset of the non-leaf nodes; that is, self-regulation components may not be required at every node at every level. In at least some embodiments, information collected at one type of interconnect fabric may be used to set self-regulation thresholds at a different type of interconnect fabric. For example, an indication of available capacity at one or more nodes connected via Fabric 2 may be used to set a threshold for packets transmitted over Fabric 1 links by leaf nodes.

Figure 5:
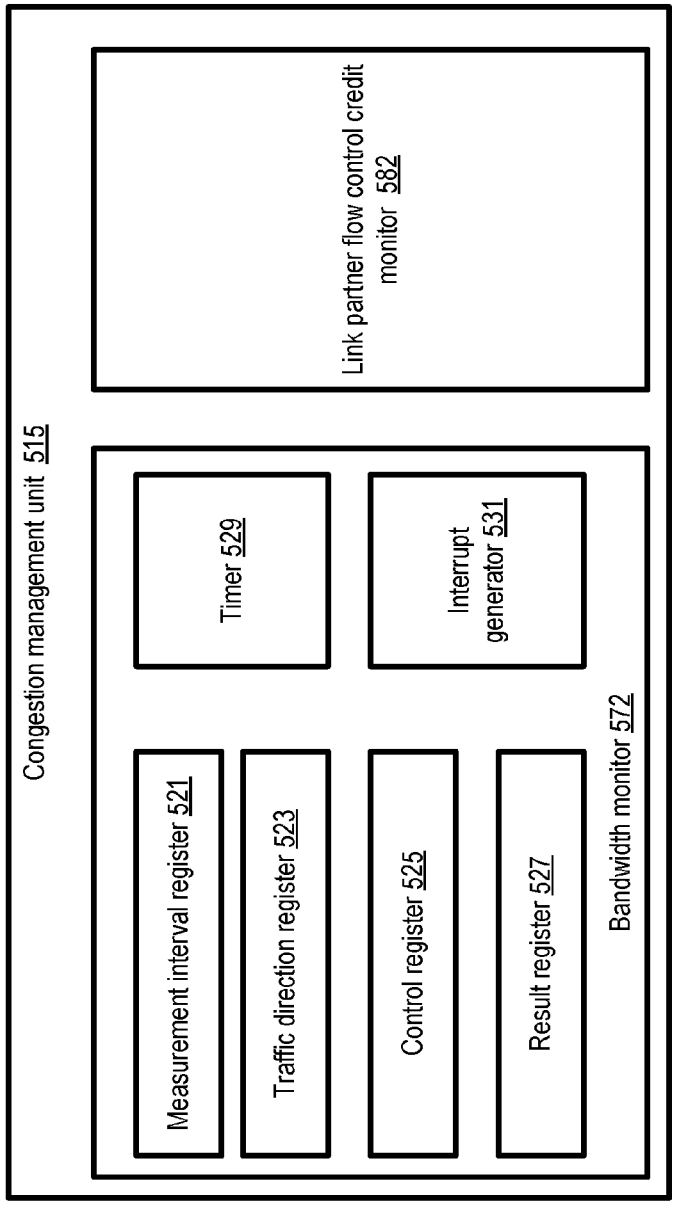
FIG. 5 illustrates example subcomponents of a hardware congestion management unit of a node of a distributed system, according to at least some embodiments.

FIG. 5 illustrates example subcomponents of a hardware congestion management unit of a node of a distributed system, according to at least some embodiments. As shown, congestion management unit 515 may comprise a bandwidth monitor 572 and a link partner flow control credit monitor 582 in the depicted embodiment.

The bandwidth monitor 572 may include a timer 529, an interrupt generator 531, and registers 521, 523, 525 and 527. The firmware component of the congestion management subsystem of the node may store a time interval in measurement interval register 521, expressed for example in integer multiples of the symbol time of the link for which traffic is to be measured. The direction of traffic for which a measurement of packet rate (e.g., whether outbound/TX packet flow is to be measured, or inbound/RX packet flow is to be monitored) for at least the next time interval may be stored in traffic direction register 523 by the firmware. The firmware may utilize control register 525 to enable or disable bandwidth monitoring. As mentioned earlier, bandwidth monitoring may be disabled from time to time to reduce power consumption or for other reasons. If bandwidth monitoring has been enabled using register control register 525 for a given time interval indicated in register 521, the number of time units of the interval during which inbound or outbound packets (depending on the direction indicated in register 523) were flowing may be latched into result register 527 at the end of the interval. The timer 529 may be used to trigger the interrupt generator 531 to issue an interrupt to the firmware microcontroller at the end of each measurement interval, notifying the firmware that a new measurement result is available in register 527. The firmware may read the contents of result register 527 and convert the number of time intervals indicated therein into the appropriate bandwidth units to be used in the firmware's decision-making process. In some embodiments, a link between a pair of distributed system nodes may comprise multiple virtual lanes or channels, and the bandwidth calculation may take the number of active lanes/channels into account. The bandwidth measurements may be used, for example, to determine at the firmware layer whether a self-regulation threshold (e.g., a threshold target with respect to unused flow control credits) should be modified.

In at least some embodiments, the firmware may modify the parameters stored in registers 521, 523 and 525 over time. For example, according to the bandwidth measurement algorithm selected for the application being run at the distributed system, outbound packet flow may be measured for some time intervals, while inbound packet flow may be measured for other time intervals (which may not necessarily be equal in length to the time intervals for which outbound packet flow is measured). In some embodiments, time intervals for which packet flow is measured in a given direction may differ from one another in length—e.g., TX traffic may be measured during one interval of M1 milliseconds, then RX traffic may be measured for M2 milliseconds, and then TX traffic may be measured for M3 milliseconds, and so on. The relative amount of time for which bandwidth in a given direction is measured may vary. In at least one embodiment, bandwidth measurement may be disabled periodically and then enabled, with the relative lengths of the enabled and disabled periods being selected dynamically by the firmware. It may be the case, for example, that if the bandwidth consumption is relatively low over some number of successive measurements, bandwidth measurement may be disabled for longer intervals (e.g., under the assumption that the bandwidth measurements are likely to continue to be low and are therefore unlikely to influence self-regulation thresholds) than if the bandwidth consumption is high.

In the depicted embodiment, the flow control credit monitor 582 may be responsible for determining, during link training phase or a similar initialization phase, the initial credit limits advertised by a link partner. In embodiments in which flow control credits are tracked separately for different categories of packets (e.g., for posted vs. non-posted operations as discussed above in the case of PCI-E), respective limits advertised for at least some of the packet categories may be obtained by credit monitor 582 and provided to the firmware microcontroller. Subsequently, as new flow control-related packets are received at the node, the credit monitor may intercept those packets, adjust its counts/totals of the available credits, and make the modified counts/totals available to the firmware layer. In at least some embodiments, the flow control credit monitor may be parameterized by the firmware in a manner similar to that used for guiding the bandwidth measurements. For example, the firmware may use registers to indicate the kinds of credits with respect to which changes are to be measured, the time intervals at which the results of the measurements are to be reported, etc., and the flow control credit monitor 582 may generate an interrupt to notify the firmware microcontroller when updates to flow control credit information is available. Depending on the kinds of credits which are the most appropriate measurement targets for the application deployed at the distributed system, the firmware may modify the credit monitoring parameters dynamically in some embodiments. The results obtained from the flow control credit monitor 582 may be used at the firmware level to adjust self-regulation thresholds (e.g., thresholds set for bandwidth) in at least some embodiments.

In at least some embodiments, a given node of the distributed system may be connected via respective links to more than one link partner. For example, one node may be connected via PCI-E to a second node, and via Infiniband™ to a third node. In some such embodiments, a respective hardware congestion management unit 572 may be used for each link. In other embodiments involving multiple links, a single hardware congestion management unit may be used for several different links. In one implementation, parameter registers (similar in concept to registers 521, 523 and 525) may be used to indicate which particular links are to be monitored during respective time intervals. In some embodiments, a hardware congestion management unit may comprise subcomponents dedicated to measuring/monitoring metrics other than bandwidth and flow control credits—e.g., a subcomponent capable of monitoring round-trip latency for request-response packets, and providing latency measures (such as maximum latency during a measurement interval, average latency during a measurement interval etc.) to the firmware layer may be implemented.

Figure 6:
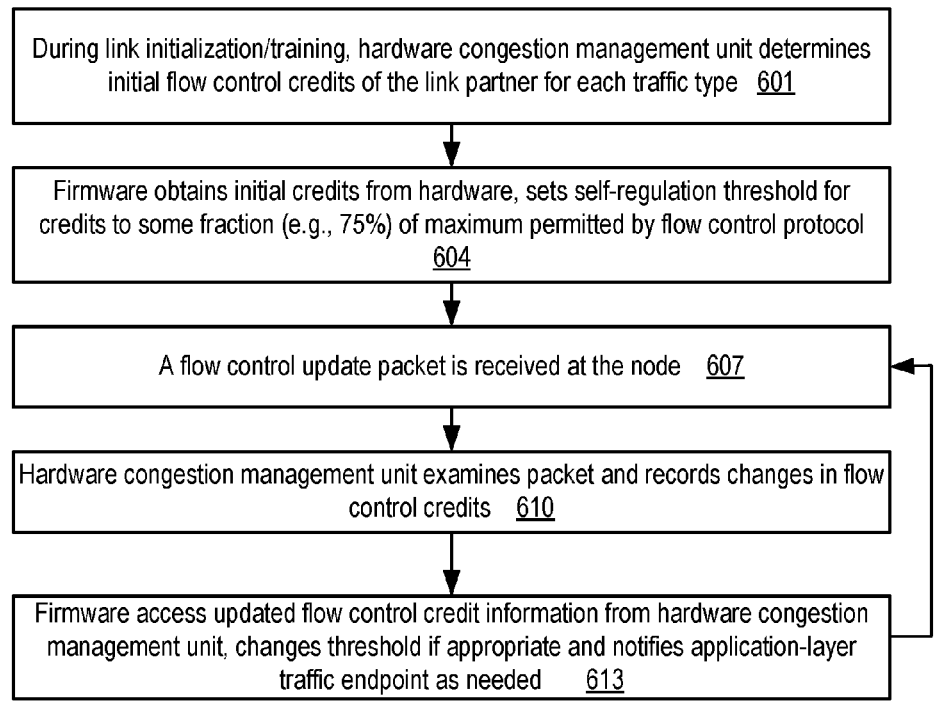
FIG. 6 is a flow diagram illustrating aspects of congestion management operations which may be performed with respect to flow control credits at a node of a distributed system, according to at least some embodiments.

FIG. 6 is a flow diagram illustrating aspects of congestion management operations which may be performed with respect to flow control credits at a node of a distributed system, according to at least some embodiments. As shown in element 601, during a link initialization or training phase, a hardware congestion management unit may determine the initial count of flow control credits advertised by a link partner for one or more traffic types.

The firmware microcontroller may obtain the initial credit counts from the hardware congestion management unit (element 604). The firmware microcontroller may set a self-regulation threshold with respect to one or more credit types to a value which is below the maximum value permitted by the flow control protocol. For example, the flow control protocol may permit a greedy approach in which a sender of packets is permitted to consume all the available credits for a particular traffic category at a given point in time, but the self-regulation threshold may be set to limit the fraction of consumed credits for that traffic category to 75% or less. The firmware may notify the application layer components at the node to limit the application traffic according to the self-regulation threshold.

When a subsequent flow control packet is received at the node (element 607), the hardware congestion management unit may examine its contents and record any changes to flow control credits indicated in the packet (element 610). The firmware microcontroller may access the updated record(s) of flow control credits (element 613), adjust one or more self-regulation thresholds if appropriate, and notify the application layer components at the node if necessary. It is noted that although flow control credits are used as one example of a metric which represents the available capacity for receiving packets at a peer node, other similar metrics indicative of receive processing capacity at a link partner may be used in some embodiments.

Figure 7:
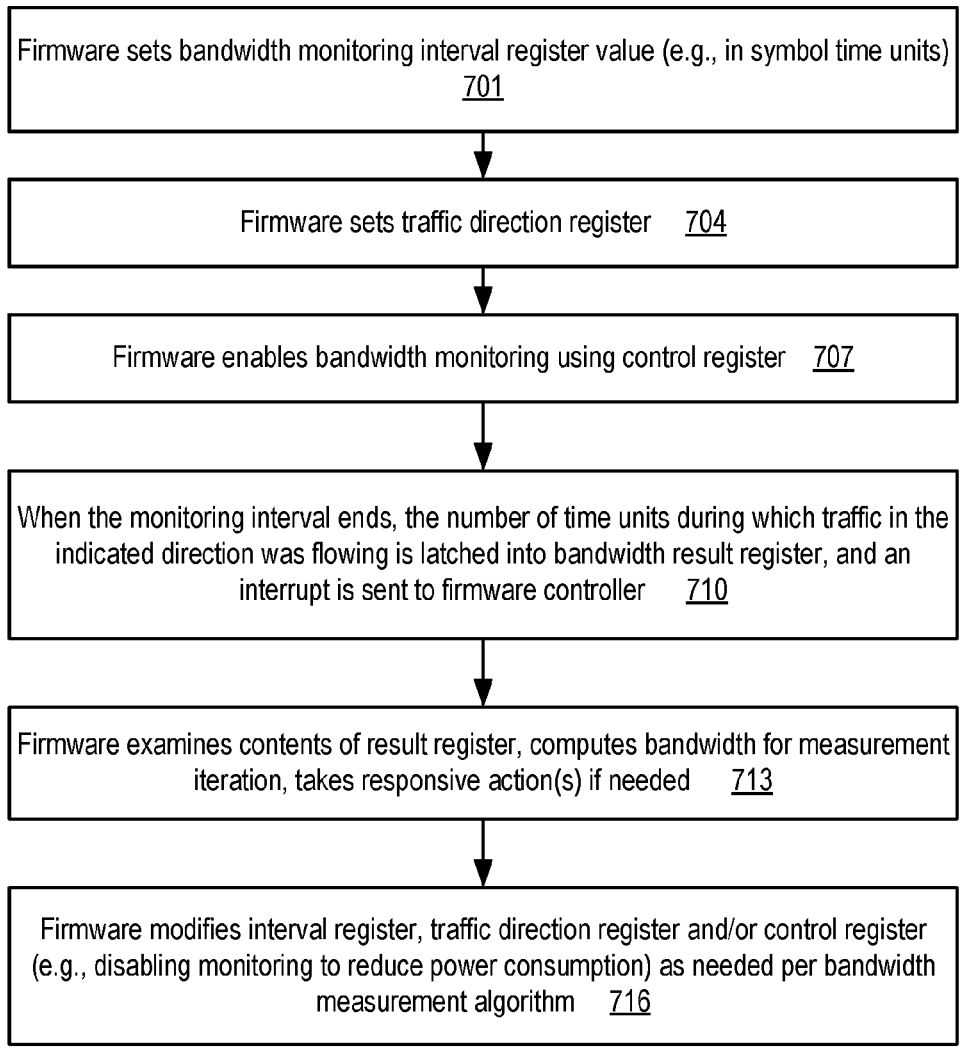
FIG. 7 is a flow diagram illustrating aspects of congestion management operations which may be performed with respect to bandwidth at a node of a distributed system, according to at least some embodiments.

FIG. 7 is a flow diagram illustrating aspects of congestion management operations which may be performed with respect to bandwidth at a node of a distributed system, according to at least some embodiments. The firmware layer of the congestion management subsystem of the node may set a bandwidth monitoring interval parameter, e.g., using a particular register of a hardware congestion management unit (element 701). In at least some embodiments, the units used for the interval may correspond to the symbol time of the physical link for which packets are to be monitored. The direction of packet flow (e.g., TX or RX) to be monitored may be set by the firmware microcontroller (element 704), and monitoring may be enabled (element 707), e.g., using additional registers in the depicted embodiment.

Based on the parameters set by the firmware, when the monitoring interval ends, the number of time units during which traffic in the indicated direction was flowing may be stored at a bandwidth result register (element 710), and an interrupt may be sent as a notification of the availability of the bandwidth measurement to the firmware microcontroller. Upon receiving the notification, the firmware layer may examine the contents of the bandwidth result register (element 713). The number of time units indicated in the register may be used to calculate bandwidth, e.g., taking the measurement interval and factors such as the number of virtual lanes over which traffic flows in parallel into account. Depending on the measured bandwidth, the firmware microcontroller may initiate responsive action(s) in some cases— e.g., a self-regulation threshold for flow control credits or for bandwidth itself may be modified, an application layer subcomponent may be notified regarding the loosening or tightening of proposed traffic restrictions, and so on.

In at least some embodiments, the firmware layer may modify the parameters governing bandwidth monitoring at one or more points in time (element 716). For example, depending on the bandwidth monitoring algorithm in use, the measurement interval and/or the direction of traffic to be monitored may be changed, or monitoring of bandwidth may be disabled temporarily in view of power consumption targets or constraints.

Figure 8:
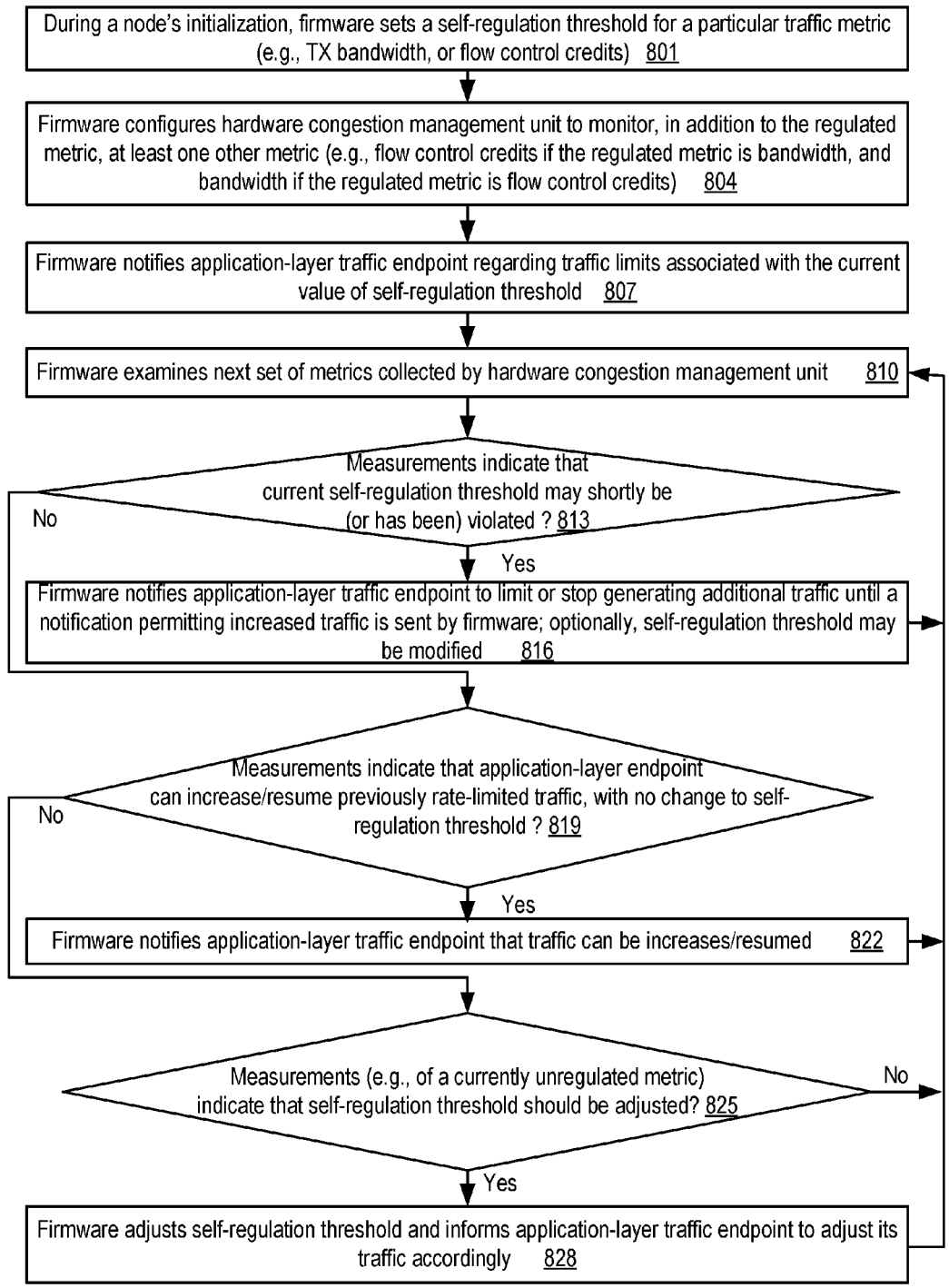
FIG. 8 is a flow diagram illustrating aspects of operations which may be performed to modify self-regulation thresholds at a node of a distributed system, according to at least some embodiments.

FIG. 8 is a flow diagram illustrating aspects of operations which may be performed to modify self-regulation thresholds at a node of a distributed system, according to at least some embodiments. As shown in element 801, during an initialization phase of the node, or when a new firmware module is installed at the node, the firmware portion of a congestion management subsystem of the node may set a self-regulation threshold for one or more traffic metrics. Any of a number of different traffic metrics may be self-regulated in different embodiments, such as bandwidth (either TX or RX) with respect to a particular link, flow control credits of a particular type with respect to a particular link partner, etc.

The firmware may configure one or more hardware congestion management units to monitor a selected set of metrics in the depicted embodiment, e.g., including at least one metric for which a self-regulation threshold is not currently set (element 804). For example, if bandwidth is being self-regulated, flow control credit counts may be monitored via the hardware in addition to the bandwidth; similarly, if the consumption of flow control credits is being self-regulated, bandwidth may be monitored using the hardware monitoring capabilities of the node.

The firmware layer may notify the application layer traffic endpoint(s) of the node regarding the self-regulation settings, e.g., by indicating limits that should be imposed on the rate of packet creation at the application layer (element 807) in view of the current self-regulation thresholds.

When the next set of measurements becomes available from the hardware congestion management unit, the firmware layer may examine the measurements (element 810). If the measurements indicate that a current self-regulation threshold has been violated, or is soon likely to be violated (as determined in element 813), the firmware may notify the application layer traffic endpoint(s) to limit or pause the generation of additional traffic until another notification permitting an increase in traffic is received from the firmware layer (element 816). The self-regulation threshold which is being or may soon be violated may itself optionally be modified. In some embodiments, the firmware layer may track trends in the measurements to determine the probability of violation of a threshold—e.g., the firmware layer may retain values of the N most recent measurements, and use the retained measurements to estimate whether or when a violation is likely to occur.

If the measurements indicate that a constraint or limit previously applied at the application layer endpoint at the request of the firmware layer can be relaxed, and that there is no need to change a self-regulation threshold (as determined in element 819), the firmware layer may notify the application layer that traffic may be increased or resumed (element 822).

In contrast to the scenarios detected in elements 819 and 813, it may sometimes be the case that the measurements indicate that a self-regulation threshold for a particular metric should be modified (e.g., based on measurements pertaining to some other metric, or based on measurements of the particular metric itself) as detected in element 825, even though there may not be an imminent violation of the threshold. For example, a self-regulation threshold for TX bandwidth may be set, and the measurements collected at the hardware congestion management unit may indicate that the number of flow control credits has increased substantially over some number of recent measurement intervals. In such a scenario, the firmware layer may increase the self-regulation threshold value for TX bandwidth. In contrast, if the number of flow control credits has decreased substantially, the self-regulation threshold for TX bandwidth may be decreased. In general, based on the measurements obtained by the hardware, the firmware may adjust one or more self-regulation threshold settings appropriately, and inform the application layer traffic endpoints to adjust their traffic accordingly (element 828). Operations similar to those corresponding to elements 813 onwards may be repeated as and when additional measurements are obtained from the hardware layer in the depicted embodiment.

It is noted that in various embodiments, at least some operations other than those illustrated in the flow diagrams of FIG. 6, FIG. 7 and FIG. 8 may be used to implement the congestion management techniques described above. Some of the operations shown may not be implemented in some embodiments or may be implemented in a different order, or in parallel rather than sequentially.

Figure 9:
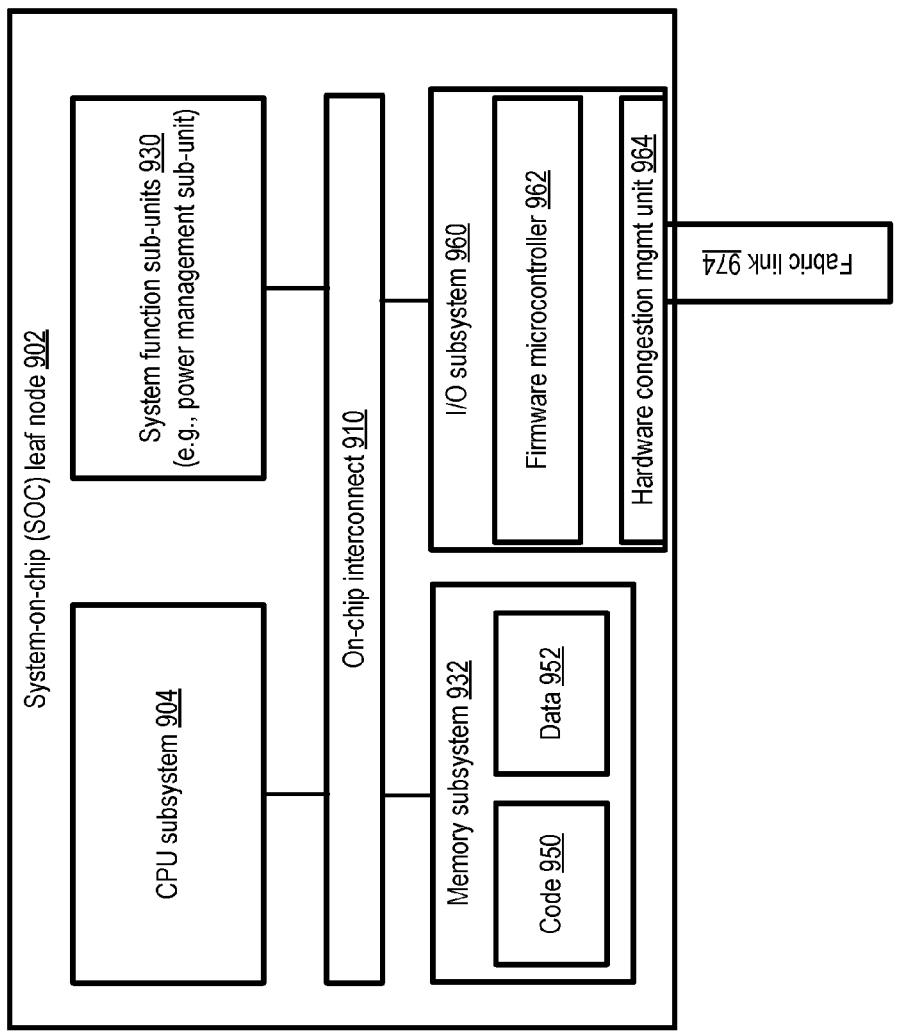
FIG. 9 is a block diagram illustrating an example system-on-chip implementation of a leaf node of a distributed system, according to at least some embodiments.

FIG. 9 is a block diagram illustrating an example system-on-chip (SOC) implementation of a leaf node of a distributed system, according to at least some embodiments. In the depicted embodiment, the leaf node 902 may comprise a CPU (central processing unit) subsystem 904, a memory subsystem 932, an I/O (input/output) subsystem 960 and a collection of one or more system function sub-units 930 such as a power management sub-unit. The components 904, 932, 960 and 930 may all be incorporated within a single chip, and may be connected to one another via an on-chip interconnect 910. The I/O subsystem 960 may include an interface to a fabric link 974 used for communicating with other nodes of the distributed system. The I/O subsystem 960 may comprise firmware microcontroller 962 and hardware congestion management unit 964 in the depicted embodiment. In some embodiments, the hardware congestion management unit 964 may be implemented as a sub-unit of a link controller. The memory subsystem 932 may be configured to store code 950 and data 952 accessible by the CPU subsystem 904. The code 950 (which may also be referred to as instructions) may include, for example, the logic for application-layer traffic endpoints with which the firmware microcontroller 962 may interact as discussed above. The CPU subsystem may include one or more processors or cores implemented according to any desired instruction-set architecture in various embodiments. The SOC leaf node may include one or more graphical processing units (GPUs) in some implementations, e.g., if the distributed application requires certain types of processing operations for which GPUs provide superior performance than conventional CPUs or cores. In some embodiments, non-leaf nodes of the distributed system may also be implemented using a system-on-chip architecture.

In some embodiments, the leaf nodes and/or other nodes of the distributed system may not be implemented using the SOC approach. Instead, a multi-chip computing device may be used for at least some of the nodes. In at least some embodiments, the memory at a leaf node may comprise both volatile and non-volatile portions; in other embodiments, only volatile memory may be used. In various embodiments, the volatile portion of the memory may be implemented using any suitable memory technology, such as static random access memory (SRAM), synchronous dynamic RAM or any other type of memory. For the non-volatile portion of memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of memory. The leaf node may comprise one or more peripheral devices and/or attached persistent and/or non-persistent storage devices in various embodiments.

In some embodiments, the memory of a distributed system node may be one embodiment of a computer-accessible medium configured to store program instructions and data for implementing embodiments of the methods and apparatus corresponding to the techniques discussed in the context of FIG. 1 through FIG. 8. For example, at least some of the self-regulation thresholds may be set and adjusted using the program instructions (e.g., instead of or in addition to using a firmware controller), and/or the measurements of one or more traffic metrics may be collected using the program instructions (e.g., instead of or in addition to using a hardware congestion management unit). In one embodiment, program instructions and/or data may be received, sent or stored upon different types of computer-accessible media. Generally speaking, a computer-accessible medium may include non-transitory storage media or memory media such as magnetic or optical media, e.g., disk or DVD/CD coupled to or incorporated within a distributed system node. A non-transitory computer-accessible storage medium may also include any volatile or non-volatile media such as RAM (e.g. SDRAM, DDR SDRAM, RDRAM, SRAM, etc.), ROM, etc., that may be included in some embodiments of a distributed system node, e.g., as part of memory subsystem 932 or another type of memory. Further, a computer-accessible medium may include transmission media or signals such as electrical, electromagnetic, or digital signals, conveyed via a communication medium such as a network and/or a wireless link. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

It is noted that with respect to the techniques for congestion management discussed above, various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A distributed system, comprising:
a plurality of nodes, wherein individual ones of the plurality of nodes comprise respective computing devices, and wherein the plurality of nodes includes a first set of leaf-level nodes connected via a first interconnect fabric;
wherein a firmware microcontroller of a first leaf-level node of the first set of leaf-level nodes is configured to:
determine a first self-regulation threshold with respect to a particular traffic metric, wherein the particular traffic metric is selected from a set of traffic metrics which includes (a) bandwidth usage and (b) flow-control credits, and wherein the first self-regulation threshold is lower than a protocol-limited maximum value permissible for the particular metric;
transmit, to an application-layer traffic endpoint of the first leaf-level node, a request to limit traffic in accordance with the first self-regulation threshold;
obtain, from a hardware congestion management unit of the first leaf-level node, one or more measurements of a different traffic metric of the set of traffic metrics;
in response to determining that the one or more measurements meet a self-regulation adjustment criterion, transmit, to the application-layer traffic endpoint, a request to limit traffic in accordance with a modified self-regulation threshold.

2. The distributed system as recited in claim 1, wherein the first self-regulation threshold indicates a fraction of available flow control credits which are to be consumed.

3. The distributed system as recited in claim 1, wherein the hardware congestion management unit of the first leaf-level node is configured to:
determine an initial value of a flow control credit limit advertised by a particular link partner of the first leaf-level node;

update the value of the flow control credit limit based at least in part on a detection of a flow control message sent by the particular link partner; and wherein the firmware microcontroller is configured to determine the initial value and the updated value of the flow control credit limit from the hardware congestion management unit.

4. The distributed system as recited in claim 1, wherein the hardware congestion management unit of the first leaf-level node comprises a bandwidth monitor, and wherein the firmware microcontroller of the first leaf-level node is configured to:
   store, at respective registers of a set of registers of the hardware congestion management unit, (a) a bandwidth monitoring interval (b) an indication of a traffic direction with respect to which bandwidth is to be monitored, and (c) an indication that bandwidth monitoring is enabled; and
wherein the bandwidth monitor of the first leaf-level node is configured to:
   store, in another register of the set of registers, an indication of a number of time units during the bandwidth monitoring interval during which traffic was flowing between the first leaf-level node and a link partner of the first leaf-level node; and
   transmit, to the firmware microcontroller, an interrupt indicating that the number of time units is available in the other register.

5. The distributed system as recited in claim 1, wherein the firmware microcontroller of the first leaf-level node is configured to:
   select, from a plurality of flow control credit types defined for the first interconnect fabric, a particular flow control credit type with respect to which one or more self-regulation thresholds are to be determined.

6. The distributed system as recited in claim 1, wherein the plurality of nodes comprise a second set of nodes connected to one another via a second interconnect fabric, wherein at least one interconnect fabric of the first and second interconnect fabrics comprise: (a) a PCI-E interconnect or (b) Infiniband™.

7. The distributed system as recited in claim 6, wherein the second set of nodes includes a particular non-leaf node comprising a congestion control subsystem, wherein the congestion control system is configured to determine, based at least in part on data transmitted along a path between the first leaf node and the particular non-leaf node, a self-regulation threshold with respect to another traffic metric.

8. The system as recited in claim 6, wherein the plurality of nodes comprise a bridge node linking the first set of nodes to the second set of nodes, wherein the bridge node comprises a congestion control subsystem configured to:
   measure a traffic metric associated with packets flowing in the second interconnect fabric; and
   cause, using the traffic metric associated with packets flowing in the second interconnect fabric, a modification of a self-regulation threshold associated with packets flowing in the first interconnect fabric.

9. The distributed system as recited in claim 1, wherein the first set of leaf-level nodes comprises a second leaf-level node, wherein the second leaf-level node is configured to adjust its self-regulation threshold for the particular traffic metric autonomously with respect to the first leaf-level node, and wherein, during a particular time interval within which the self-regulation threshold for the particular traffic metric is set to a first value, the firmware microcontroller of second leaf-level node is configured to:
   set the self-regulation threshold for the particular traffic metric to a different value with respect to the second leaf-level node.

10. The distributed system as recited in claim 1, wherein the plurality of leaf-level nodes comprises a second set of leaf-level nodes connected via a second interconnect fabric, and wherein a firmware microcontroller of a second leaf-level node of the second set of leaf-level nodes is configured to:
   determine, using a hardware congestion management unit of the second leaf-level node, a self-regulation threshold for one or more traffic metrics with respect to traffic generated at an application-layer traffic endpoint of the second leaf-level node.

11. A method, comprising:
   determining, at a firmware microcontroller of a first leaf-level node of a plurality of leaf-level nodes of a distributed system, a first self-regulation threshold with respect to a particular metric of traffic between the first leaf-level node and one or more other nodes of the distributed system;
   sending, by the firmware microcontroller to an application-layer traffic endpoint of the first leaf-level node, a request to limit traffic in accordance with the first self-regulation threshold;
   obtaining, at the firmware microcontroller, from a hardware congestion management unit of the first leaf-level node, one or more measurements of a different metric of traffic;
   in response to determining that the one or more measurements meet a self-regulation adjustment criterion, providing, from the firmware microcontroller to the application-layer traffic endpoint, an indication of a modified self-regulation threshold.

12. The method as recited in claim 11, wherein the first self-regulation threshold indicates a minimum fraction of available flow control credits which are to be left unused.

13. The method as recited in claim 11, further comprising:
   storing, by the firmware microcontroller at respective registers of a set of registers accessible from the hardware congestion management unit, (a) a bandwidth monitoring interval (b) an indication of a traffic direction with respect to which bandwidth is to be monitored, and (c) an indication that bandwidth monitoring is enabled;
   storing, by the hardware congestion management unit in another register of the set of registers, an indication of a number of time units during the bandwidth monitoring interval during which traffic was flowing between the first leaf-level node and another node of the distributed system; and
   transmitting, by the hardware congestion management unit to the firmware microcontroller, an interrupt indicating that the number of time units is available in the other register.

14. The method as recited in claim 13, wherein the indication that bandwidth monitoring is enabled is stored in a particular register of the set of registers, further comprising:
   storing, in the particular register by the firmware microcontroller, based at least in part on a power consumption constraint, an indication that bandwidth monitoring is disabled.

15. The method as recited in claim 11, further comprising:
   selecting, by the firmware microcontroller from a plurality of flow control credit types defined for the first interconnect fabric, a particular flow control credit type with respect to which one or more self-regulation thresholds are to be determined.

16. The method as recited in claim 15, wherein the plurality of flow control credit types comprise a flow control credit type corresponding to one or more of: (a) posted transport layer packet requests, (b) non-posted transport layer packet requests or (c) completions of non-posted transport layer packet requests.

17. A particular node of a distributed system, wherein the distributed system comprises a plurality of nodes, wherein individual nodes of at least a first subset of the nodes are connected to one another via a first interconnect fabric, wherein the particular node comprises a controller configured to:
   determine a first self-regulation threshold with respect to a particular metric of traffic between the particular node and one or more other nodes of the distributed system;
   send, to an application-layer traffic endpoint of the particular node, a request to limit traffic in accordance with the first self-regulation threshold;
   obtain, from a hardware congestion management unit of the particular node, one or more measurements of a different metric of traffic;
   in response to determining that the one or more measurements meet a self-regulation adjustment criterion, provide, from the firmware microcontroller to the application-layer traffic endpoint, an indication of a modified self-regulation threshold.

18. The particular node as recited in claim 17, wherein the first self-regulation threshold indicates a target for a fraction of packet receive buffer space to be left unused at a different node of the distributed system.

19. The particular node as recited in claim 17, wherein the controller is configured to:
   store, at respective registers of a set of registers accessible from the hardware congestion management unit, (a) a bandwidth monitoring interval (b) an indication of a traffic direction with respect to which bandwidth is to be monitored, and (c) an indication that bandwidth monitoring is enabled;
   receive, from the hardware congestion management unit, a notification indicating that a number of time units of the bandwidth monitoring interval during which traffic was flowing between the particular node and another node of the distributed system is available in another register.

20. The particular node as recited in claim 19, wherein the controller is configured to:
   select, from a plurality of flow control credit types defined for the first interconnect fabric, a particular flow control credit type with respect to which one or more self-regulation thresholds are to be determined.

* * * * *